Aug. 19, 1952 — G. CAMILLI ET AL — 2,607,824
TWO-WAY STRETCH PAPER IN INSULATED CABLES
Filed Dec. 21, 1950 — 2 SHEETS—SHEET 1

Inventors:
Guglielmo Camilli,
Leo Mulligan,
by Ernest C. Britton
Their Attorney.

Inventors:
Guglielmo Camilli,
Leo Mulligan,
by Ernest C. Britton
Their Attorney.

Patented Aug. 19, 1952

2,607,824

UNITED STATES PATENT OFFICE 2,607,824

TWO-WAY STRETCH PAPER IN INSULATED CABLES

Guglielmo Camilli, Pittsfield, and Leo Mulligan West Stockbridge, Mass., assignors to General Electric Company, a corporation of New York Application December 21, 1950, Serial No. 202,075

4 Claims. (Cl. 174—124)

This invention relates to electrical cables and, more particularly, to crepe paper insulation for such cables.

In certain applications where electrical cables are used, it is desirable to have a cable capable of being subjected to sharp bends. For example, in the internal connections of an electrical transformer, it is sometimes desirable to subject a cable to sharp bends approaching a bending radius of two times the diameter of the cable. However, such an extremely sharp curvature of bending exceeds in severity by a considerable margin concepts prevalent in the cable industry regarding maximum permissible sharpness of bending.

It is an object of this invention to provide a new and improved insulation for electrical cables which will permit such cables to be bent into curvatures of small radius.

It is a further object of this invention to provide a paper insulation for an electrical cable capable of yielding in several directions.

In accomplishment of these objectives, this invention provides an electrical cable for high voltage installations having a plurality of layers of crepe paper insulation spirally wound about the conductor member, with the crepe paper being provided with two crepings which are substantially perpendicular to one another.

Figure 1:
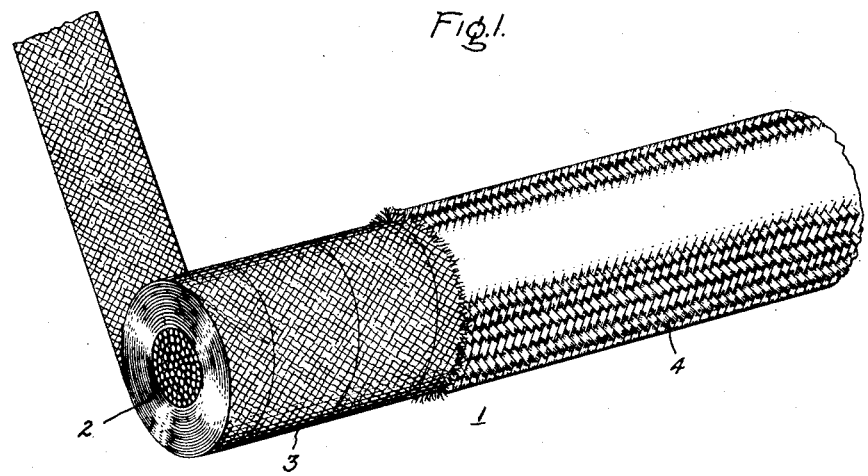
Figure 3:
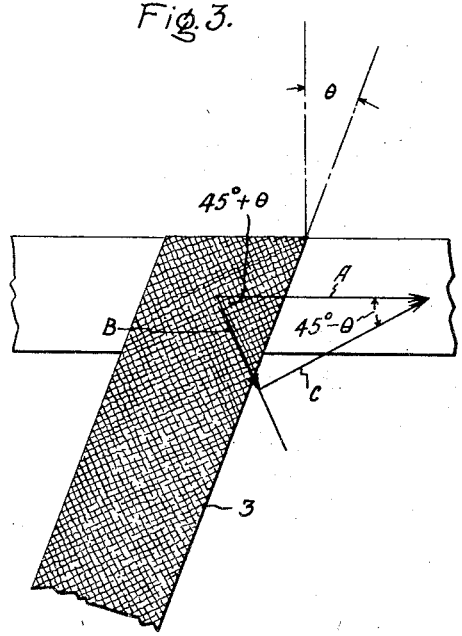
Figure 2:
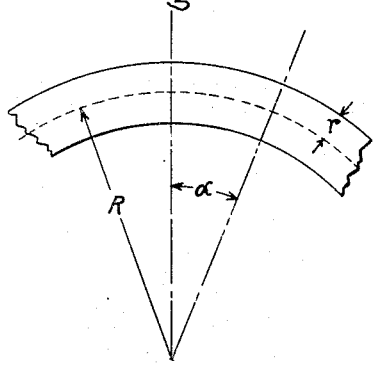
Figure 4:
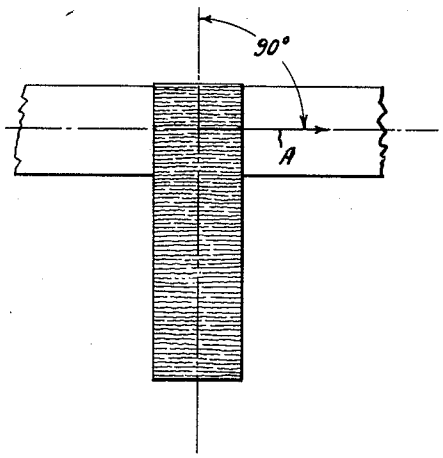
Figure 5:
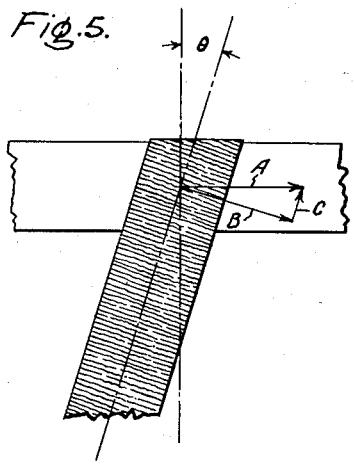
Figure 6:
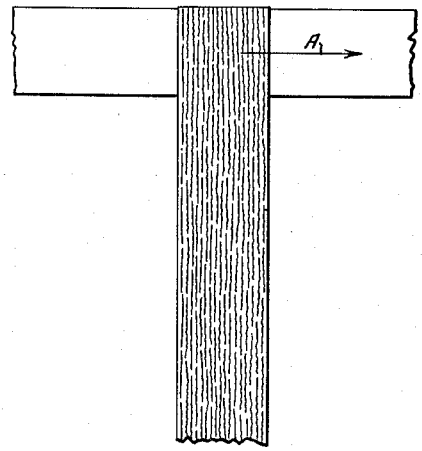
Figure 7:
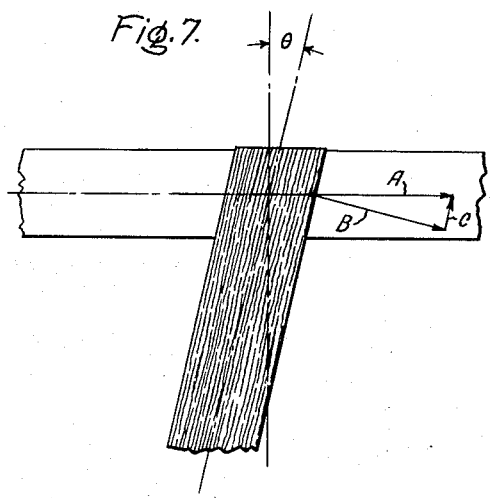

The features of this invention which we believe to be novel are set forth with particularity in the appended claims. Our invention, however, both as to its organization and use, together with further objects and advantages thereof, may best be understood by reference to the following description taken in connection with the accompanying drawing in which Fig. 1 represents a portion of a cable incorporating two-way stretch crepe paper insulation in accordance with our invention; Fig. 2 is a view of a cable bent to a small radius; Fig. 3 represents a detail view of the two-way stretch crepe paper used in accordance with our invention; Figs. 4 and 5 are views of a one-way stretch crepe paper having the creping substantially perpendicular to the axis of the crepe paper tape; while Figs. 6 and 7 are views of a one-way stretch crepe paper in which the crepe lines are substantially parallel to the axis of the tape.

Referring now to the drawing, there is shown in Fig. 1 a cable 1 with a multi-strand copper conducting core 2 having wound thereon a plurality of layers of our two-way stretch crepe paper insulation 3. A braided fiber or cloth sheath 4 of any suitable type serves as an outer protective covering for the cable. It should be noted that the crepe paper tape is the only layered or solid insulating medium surrounding the conductor, with the fiber cover 4 serving only as an abrasion-resistant covering which is thin in a radial direction as compared to the radial thickness of the superposed layers of crepe paper insulation.

In accordance with our invention, the crepe paper insulation which is spirally wound around the copper conductor 2 is in the form of a tape of crepe paper having positioned thereon two crepings which are substantially perpendicular to one another. The use of such two-way stretch crepe paper permits the crepe paper insulation to readily adapt itself when the cable is bent into turns of a short radius.

Referring to Fig. 2, which shows a short length of cable which is bent to a radius $R$, it will be seen that when a paper insulated cable is bent to a radius $R$, the fibers of the paper which lie on the outside of the curve will be stretched and those which lie on the inside will be compressed. If the length of cable corresponding to an angle $a$ is considered, the length measured along the axis of the cable will be $Ra$ and the length on the outside surface will be $(R+r)a$, where $r$ is the radius of the cable. Thus, it will be seen that the elongation which the paper has to withstand on a length $Ra$ is $ra$. The percentage of elongation will be $$\frac{r}{R} \text{ times } 100$$

Ordinary manila paper will elongate two per cent before breakdown. From this, it may be concluded that a cable insulated with ordinary manila paper should not be bent to a radius smaller than that given by $$\frac{r}{R} \text{ times } 100 = 2$$

in which case $R = 50r$. It can, therefore, be said that when ordinary manila paper is used in the making of a cable the radius of curvature should not be smaller than 25 times the diameter of the cable.

In applying a paper tape insulation about a conductor, such as a crepe paper tape, the tape is wound spirally about the conductor, with the winding angle of the paper tape with respect to the axis of the cable being designated as the angle of lay. In accordance with the standard procedure for applying a tape spirally onto a cable, the cable is advanced axially at a constant speed, while a winding head revolves at a constant speed about the cable and applies the tape to the cable. Thus, the pitch of the tape remains constant, since the distance the cable moves axially during one revolution of the winding head remains constant. However, since the radial thickness of the cable increases as the number of layers of crepe paper increases, the angle of lay changes, due to the increased circumference but constant pitch of the cable.

While for any particular angle of lay there is a corresponding ideal angle at which the crepe lines on one-way stretch crepe paper could be arranged on the paper in order to provide maximum flexibility for bending, this ideal creping angle changes with each succeeding layer of crepe paper insulation, due to the change in angle of lay as the cable becomes greater in circumference.

An advantage of the use of two-way stretch crepe paper is that it provides a solution to the problem of obtaining maximum cable flexibility where the angle of lay of succeeding layers of crepe paper constantly changes as each succeeding layer is applied. Regardless of what the angle of lay may be for any particular layer of the insulation, our two-way stretch crepe paper can supply the necessary components of elongation necessary for the given angle of lay.

A further advantage of the use of two-way stretch crepe paper insulation is that the cross-creping, due to the two crepings arranged mutually perpendicularly to each other, resists a tendency to interlock, which sometimes occurs between adjacent layers of one-way stretch crepe paper. Such interlocking of the crepe lines on adjacent layers is undesirable, since it reduces the flexibility of the cable.

In Fig. 3, we have illustrated a single crepe paper tape being applied to a cable, with the angle of lay in this particular layer being equal to $\theta$. In accordance with our invention, the crepe paper which is used has two crepings which are substantially perpendicular to each other, and in this case, the two crepings are inclined at an angle of substantially 45 degrees to the axis of the tape. In connection with Fig. 3, there is shown a graphical analysis of the elongation which occurs when the cable is bent, and the components into which this elongation may be split. The elongation parallel to the axis of the cable is designated by the vector A. The elongation A can be split up into two components which are respectively parallel to the two directions of creping, these two components being designated as B and C, respectively. Elongation vector A is equal to the vectorial sum of the respective component elongations B and C. It can be shown that the angle included between vectors A and $B = 45$ degrees $+ \theta$, while the angle included between vectors A and $C = 45$ degrees $- \theta$. Furthermore, the value of vector $B = A \cos (45 + \theta)$, while vector $C = A \sin (45 + \theta)$.

In the particular case illustrated in Fig. 3, the per cent stretch of which the crepe paper should be capable is provided by the following formulae:

$$\text{Per cent stretch in direction } B = \frac{r}{R} 100 \cos (45 + \theta)$$

$$\text{Per cent stretch in direction } C = \frac{r}{R} 100 \sin (45 + \theta)$$

That is, the percentage of stretch of which the crepe paper is capable in the two directions of creping should be at least equal to that calculated by the above formulae in order to permit satisfactory bending of the cable.

These relations can be stated in a more general way by the following equations:

$$\text{Per cent stretch in direction } B = \frac{r}{R} 100 \cos (\omega + \theta)$$

$$\text{Per cent stretch in direction } C = \frac{r}{R} 100 \sin (\omega + \theta)$$

where $r$ = radius of the insulated cable
$R$ = radius of curvature of the cable
$\omega$ = angle of creping from the axis of the strip of paper
$\theta$ = angle of lay used in the insulation of the cable.

To illustrate the advantage of the use of two-way stretch crepe paper over conventional crepe paper having crepe lines in only one direction, there is shown in Figs. 4 and 5 a crepe paper tape for insulating a cable in which the crepe lines are perpendicular to the axis of the tape. In Fig. 4, the tape is shown wound perpendicularly to the axis of the cable. It is evident in this case that there is absolutely no advantage in using a crepe paper having crepe lines perpendicular to the axis of the tape over the use of uncreped paper, since the crepe lines are in the wrong direction insofar as yielding is concerned. In the embodiment shown in Fig. 4, the crepe paper will not stretch at all, since the crepe lines are parallel to the axis of the cable and have no component perpendicular to the axis of the cable. However, in practice, the paper is wound spirally on the conductor, as shown in Fig. 5, and the angle of lay $\theta$ may be of the order of between 15 and 20 degrees. Assuming that the angle of lay is 20 degrees in Fig. 5, it will be seen that in order to avoid breaking the paper, both components B and C of elongation A should be taken care of. For $\theta = 20$ degrees, component $B = .94A$, and component $C = .34A$. In the case of the one-way stretch crepe paper shown in Figs. 4 and 5, the component B is not taken care of at all, since there are no crepe lines which permit elongation in the direction of B.

There is shown in Figs. 6 and 7 a tape having crepe lines parallel to the axis of the tape. In Fig. 6, the tape is shown wound perpendicularly to the axis of the cable. If the paper could be wound, as shown in Fig. 6, with the type of creping shown in that figure, very satisfactory results could be obtained without any further complications, since the alignment of the crepe lines is perpendicular to the axis of cable and, hence, capable of yielding axially of the cable when the cable is bent. However, in practice, the paper must be wound with an angle of lay $\theta$, as shown in Fig. 7, and in order to avoid breakage of the paper when the cable is bent both components B and C must be taken care of. Assuming that the angle of lay is 20 degrees, to avoid breakage of the paper it is necessary that the paper be provided with two stretches: first, with a stretch perpendicular to the axis of the paper tape, represented by component B, equal to not less than 94 per cent of the elongation of the outside surface of the bent cable, and an additional stretch along the axis of the paper, represented by component C, equal to 34 per cent of the elongation of the outside surface of the bent cable. The one-way stretch crepe paper of Fig. 7 is not provided with a creping capable of yielding in direction C.

Taken together, Figs. 4, 5, 6, and 7 show that crepe paper tape having creping lines in only one direction, whether that direction be perpendicular to the axis of the tape or parallel to the axis of the tape is insufficient to permit sharp cable bends.

Our cable having two-way stretch crepe paper insulation is capable of withstanding sharp cable bends having a radius of curvature of the order of two times the diameter of the cable. Furthermore, a two-way stretch crepe paper insulation such as we have disclosed adapts itself readily to the change in angle of lay which occurs as successive layers of crepe paper are wound on the cable and resists interlocking between the crepe lines of adjacent layers.

While we have illustrated an embodiment of our invention in which the mutually perpendicular crepe lines of our two-way stretch crepe paper insulation are arranged at an angle of 45 degrees with respect to the axis of the crepe paper tape, it is obvious that we may shift the position of our crepe lines with respect to the axis of the tape. For example, one of the crepings may be parallel to the axis of the tape and the other creping may be perpendicular to the axis of the tape.

While there has been shown and described a particular embodiment of our invention, it will be obvious to those skilled in the art that various changes and modifications can be made therein without departing from the invention and, therefore, it is aimed in the appended claims to cover all such changes and modifications as fall within the true spirit and scope of the invention.

What we claim as new and desire to secure by Letters Patent of the United States is:

1. An electrical cable including an electrical conductor, and a plurality of layers of crepe paper tape spirally wound about said conductor, said spirally-wound crepe paper tape advancing longitudinally along the axis of said conductor, said crepe paper tape having two crepings substantially perpendicular to each other so that each individual layer of said crepe paper tape can stretch in two directions.

2. An electrical cable including an electrical conductor, and a plurality of layers of crepe paper tape spirally wound about said conductor, said spirally-wound crepe paper tape advancing longitudinally along the axis of said conductor, said crepe paper tape having two crepings substantially perpendicular to each other so that each individual layer of said crepe paper tape can stretch in two directions, each of said crepings making an angle of substantially 45 degrees with respect to the axis of said tape.

3. An electrical cable comprising an electrical conductor, and a plurality of layers of crepe paper tape spirally wound about said conductor, said spirally-wound crepe paper tape advancing longitudinally along the axis of said conductor, said crepe paper tape having two crepings substantially perpendicular to each other so that each individual layer of said crepe paper tape can stretch in two directions, one of said crepings being substantially parallel to the axis of said tape, and the other of said crepings being substantially perpendicular to the axis of said tape.

4. An electrical cable including an electrical conductor, a plurality of layers of crepe paper tape spirally wound about said conductor, said spirally-wound tape advancing longitudinally of the axis of said conductor, said crepe paper tape having two crepings substantially perpendicular to each other so that each individual layer of said crepe paper tape can stretch in two directions, and a protective sheath covering the outermost layer of said crepe paper, said crepe paper and said sheath constituting substantially the only solid coverings surrounding said conductor.

GUGLIELMO CAMILLI.
LEO MULLIGAN.

REFERENCES CITED

The following references are of record in the file of this patent:

UNITED STATES PATENTS

| Number | Name | Date |
|---|---|---|
| 2,045,103 | Rosch | June 23, 1936 |
| 2,071,347 | Kemp | Feb. 23, 1937 |

FOREIGN PATENTS

| Number | Country | Date |
|---|---|---|
| 19,951 | England | Sept. 7, 1901 |